No. 886,473.  
PATENTED MAY 5, 1908.  
F. A. BROWNELL.  
FOLDING PHOTOGRAPHIC CAMERA.  
APPLICATION FILED MAY 18, 1905.
3 SHEETS—SHEET 1.
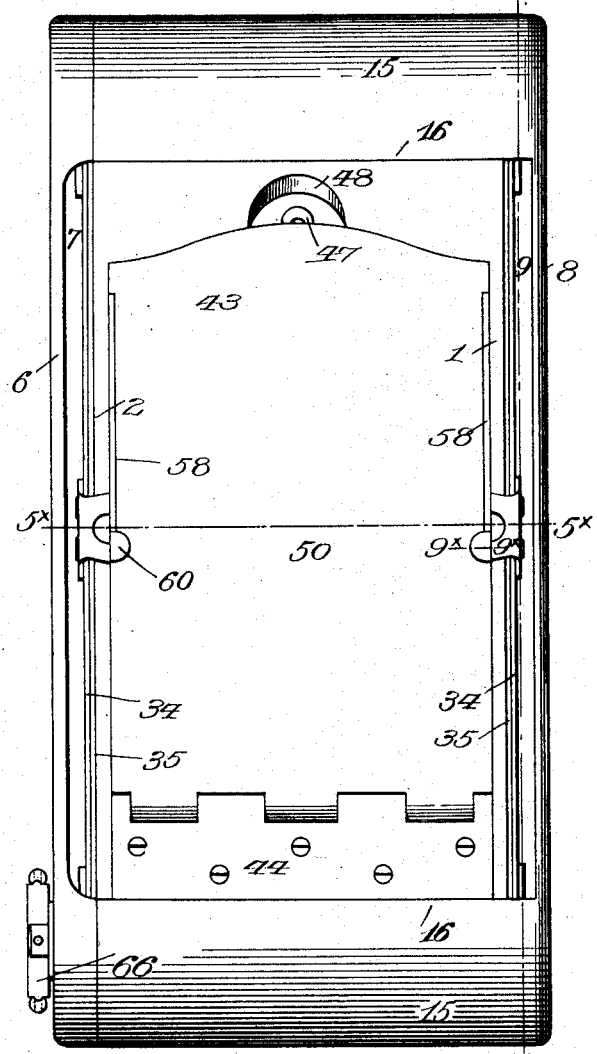
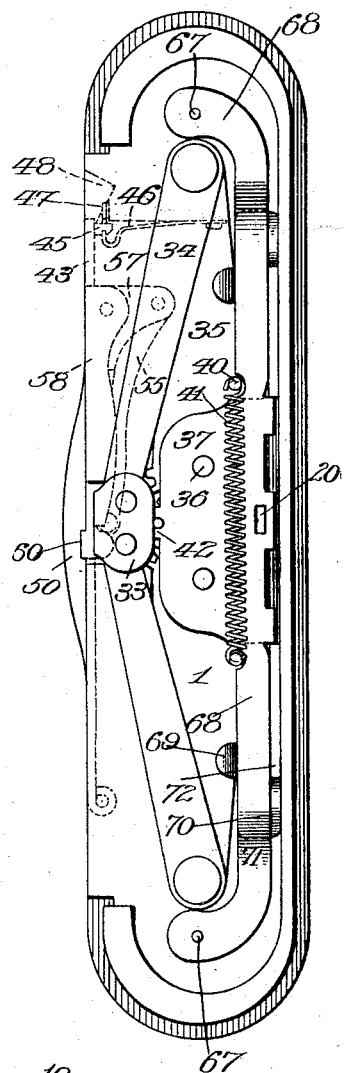
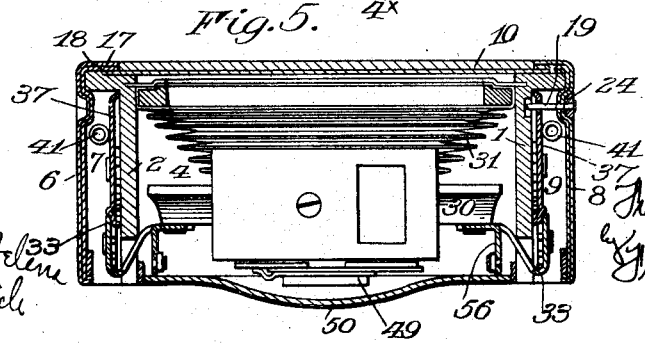

No. 886,473. PATENTED MAY 5, 1908.
F. A. BROWNELL.
FOLDING PHOTOGRAPHIC CAMERA.
APPLICATION FILED MAY 18, 1905.
3 SHEETS—SHEET 2.
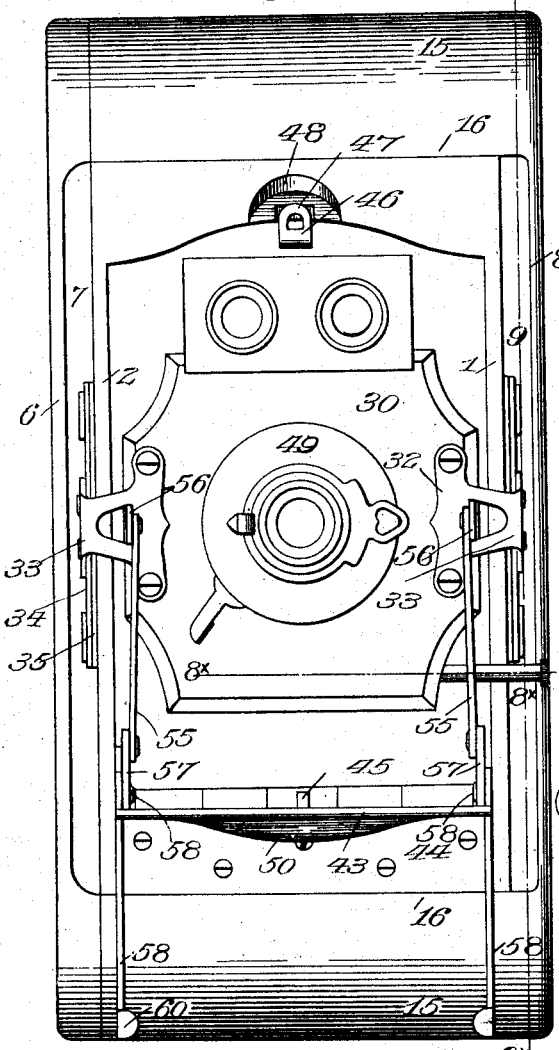
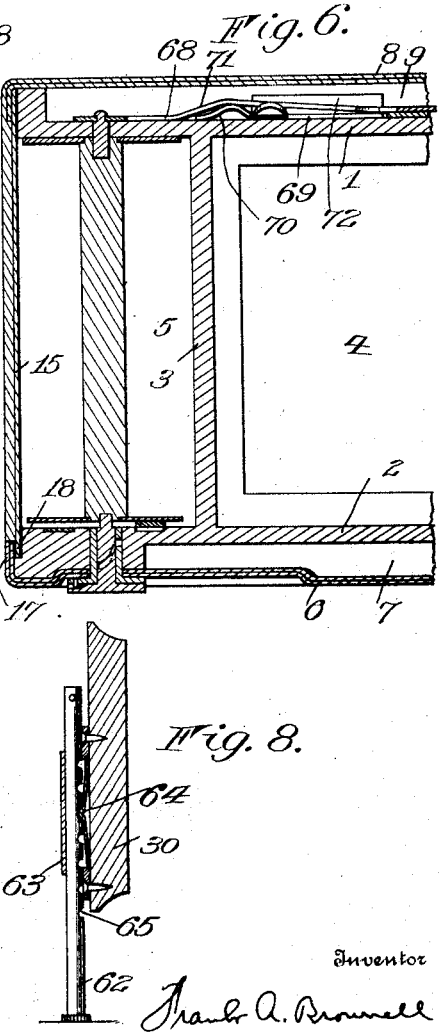
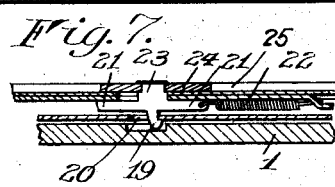

No. 886,473. PATENTED MAY 5, 1908.
F. A. BROWNELL.
FOLDING PHOTOGRAPHIC CAMERA.
APPLICATION FILED MAY 18, 1905.
3 SHEETS—SHEET 3.
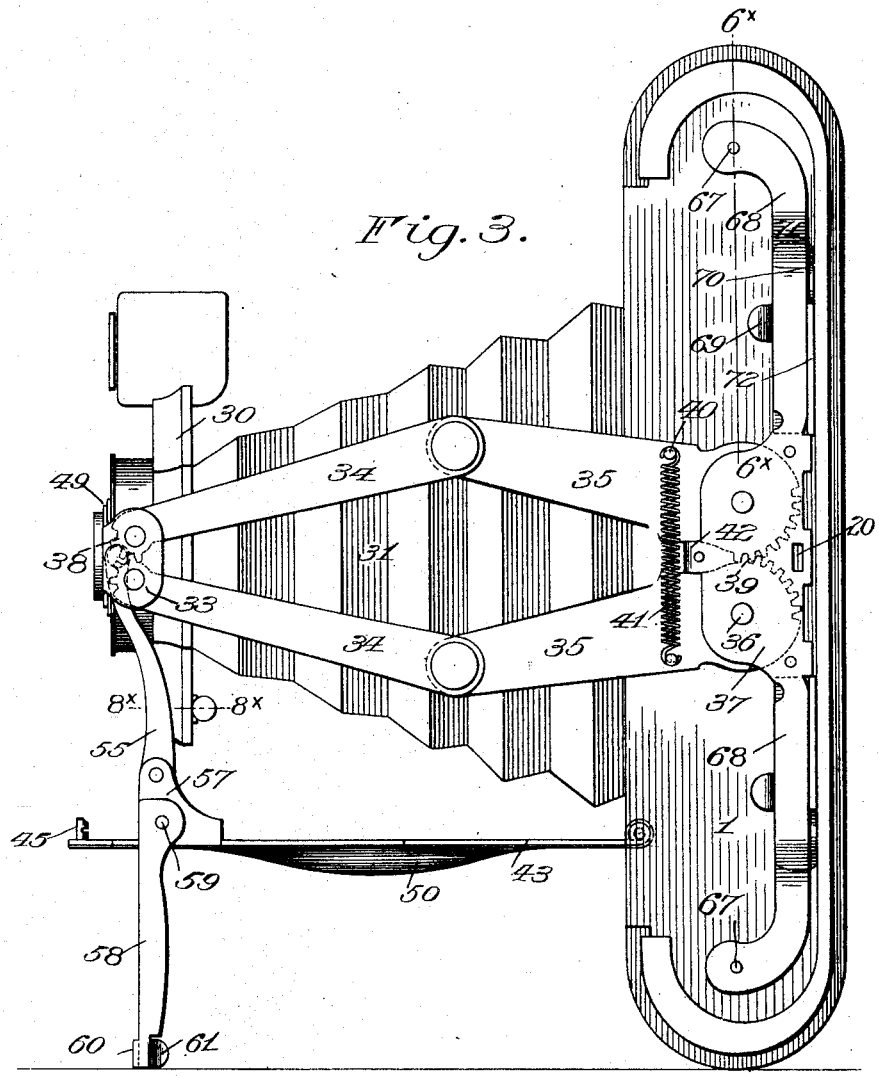

UNITED STATES PATENT OFFICE.

FRANK A. BROWNELL, OF ROCHESTER, NEW YORK, ASSIGNOR TO EASTMAN KODAK COMPANY, OF ROCHESTER, NEW YORK, A CORPORATION OF NEW YORK.

FOLDING PHOTOGRAPHIC CAMERA.

No. 886,473.  Specification of Letters Patent.  Patented May 5, 1908.

Application filed May 18, 1905. Serial No. 261,082.

*To all whom it may concern:*

Be it known that I, FRANK A. BROWNELL, of Rochester, in the county of Monroe and State of New York, have invented certain new and useful Improvements in Folding Photographic Cameras; and I do hereby declare the following to be a full, clear, and exact description of the same, reference being had to the accompanying drawings, forming a part of the specification, and to the reference-numerals marked thereon.

My present invention relates to cameras and particularly to that class which are adapted to be folded into small compass such as those shown in Patents Nos. 610,153 and 713,597 granted to me on the 30th day of August, 1898, and November 18, 1902, respectively, and it has for its object to provide upon such a camera a closure for the casing to protect the lens and other parts together with means for automatically projecting the lens board, or mounting, into operative position when the closure is opened.

My invention has for its further object to provide improved supporting devices for holding the camera in operative position, also a locking mechanism for the removable portion of the casing and means for readily disengaging the centering pins or studs from the film spools.

To these and other ends the invention consists in certain improvements and combinations of parts all as will be hereinafter more fully described, the novel features being pointed out in the claims at the end of the specification.

In the drawings: Figure 1 is a front elevation showing a camera constructed in accordance with my invention with the parts in the closed or folded position. Fig. 2 is a similar view thereof showing the camera with the parts opened and the lens board projected. Fig. 3 is a side elevation showing the parts in the same position as in Fig. 2, with a portion of the casing removed along the line of $3^\times 3^\times$ of Fig. 2. Fig. 4 is a sectional view on the line $4^\times 4^\times$ of Fig. 1. Fig. 5 is a horizontal section view taken on the line $5^\times 5^\times$ of Fig. 1. Fig. 6 is a sectional view of line $6^\times 6^\times$ of Fig. 3. Fig. 7 is a detail view of the locking device for securing the removable portion of the casing. Fig. 8 is a detail view taken on the line $8^\times 8^\times$ of Fig. 3, showing an extensible support for the lens board. Fig. 9 is a detail sectional view taken on the line $9^\times 9^\times$ of Fig. 1.

Similar reference numerals in the several figures indicate similar parts.

In illustrating my invention I have shown it applied to a camera body having sides 1 and 2 between which are located partitions 3 forming a central chamber, having an aperture 4 therein, and film chambers or pockets 5 located at opposite sides of the central chamber the construction being the same as that in my prior patent No. 610,153. One side of the camera body is provided with a section 6 of a casing which is secured at the ends of the side 2 its central portion being spaced therefrom to form a channel 7. The remaining portion of the casing constitutes a removable cover comprising a side 8, adapted to extend over the side 1 of the body at a short distance therefrom to form a channel 9, a back 10 having curved ends 15 terminating in inwardly extending projections, or flanges, 16 fitting in corresponding grooves, or slots, provided in the forward edges of the partitions 3, said back and ends forming a light tight closure for the camera body and the film chambers or pockets. The stationary and removable portions of the casing are preferably constructed of metal and provided with a suitable covering, as shown, their meeting edges being formed to overlap, as illustrated in Figs. 5 and 6, by providing a laterally extending flange 17, on the portion 6, which embraces the edges 18 of the back and end portions 10 and 15.

Mounted centrally on the portion 8 of the cover is a latch member having a hooked portion 19 adapted to extend through an aperture 20 in a plate attached to the side 1 of the camera, as shown in Fig. 7. The latch member is also provided at opposite sides with fingers 21 to one of which is attached the retractile spring 22, and a projection 23, operating in an elongated aperture and secured to a finger piece 24, guided between the sides of the channel 25 formed in the side 8. This arrangement of the parts enables the latch member to be secured in operative position without employing other guiding devices. The cover portion of the casing constructed as described, may be removed from the camera body by drawing it laterally after the locking member has been released to afford access to the film chambers, as will be understood.

The lens board 30 is connected to the rear of the central chamber of the camera around the exposure aperture 4 by the bellows 31 and it is supported at each side by jointed arms which cause it to be moved outwardly or projected into operative position whenever it is desired to make an exposure. Attached to the outer surface of the lens board and extending forwardly and laterally from the side edges thereof are bearing plates 32, having ends 33 extending rearwardly in alinement with the channels 7 and 9 to which are journaled the outer ends of a pair of arms 34 the rear ends thereof being pivoted to the forward ends of a pair of supporting arms 35, journaled on studs 36, secured between plates 37, and the proximate side of the camera body. The forward ends of the arms 34 are provided with intermeshing gear teeth 38 and the rear ends of the arms 35 are also provided with similar teeth 39 whereby a simultaneous and equal rotation on their pivots in opposite directions is insured at all times. On each of the arms 35 is provided a pin or stud 40 to which are attached the ends of a spring 41, arranged in such position that when the arms are extended, as shown in Fig. 3, it will hold them in operative position, in engagement with a central stop 42 formed by a downwardly extending lip on the plate 37, and when the camera is folded in inoperative position it will extend in rear of the pivotal points 36 to hold the lens board within the central chamber, as shown in Fig. 4.

When the camera is closed the front of the body is covered by a door 43, hinged on a plate 44, at one side of the central chamber, and adapted to be opened outwardly, as shown in Figs. 2 and 3. At the free edge of the door is provided a pin 45 having a beveled end and a notch or recess in rear thereof with which coöperates a spring finger 46, shown in dotted lines in Fig. 4, to hold the door in a closed position the outer end of the finger projecting upwardly as indicated at 47 into a recess 48. By arranging the retaining finger in proximity to the end of the door the operator may conveniently release it by one of his fingers and also engage the edge of the door to swing it outwardly. A shutter, such as indicated by 49, may be mounted on the lens board 30 and as shutters of various makes may be provided on a camera, either by the manufacturer thereof or the purchaser thereof, which may vary in size provision is made to accommodate shutters which may project different distances by forming a door with a central bulge 50 to provide a recess in the inner face thereof, as will be understood.

In order to provide means whereby the lens mounting or board 30 may be automatically projected, when the door 43 is opened, and supported on the movable arms they are connected thereto by arms, or links, 55, journaled at their upper ends to forwardly projecting ears or lugs 56, on the plates 32 and at their lower ends to plates 57, at the edges of the door, the pivotal points of the ends of the arms being so arranged, relatively to the line of travel of the outer ends of the arms 34, that they may be folded within the camera casing, as shown in dotted lines in Fig. 4, and operate, when the door begins to open, to draw the arms 34 and 35 outwardly and when they are fully extended, by the springs 41, to support the door at a right angle to the camera casing.

It is frequently desirable to make a negative under conditions requiring exposures to be made for a greater or less length of time which necessitates the camera being held stationary and to enable the operator to support it in an upright position, upon a table or other object, I provide folding legs 58 adapted, when not in use, to lie in recesses formed in the side edges of the door. These legs are pivoted to the plates 57 and when in the operative position the shoulders at the forward ends of the recesses limit their rotary movement. At the outer ends of the legs are flanges 60 and spring fingers 61 which engage the edge of the door 43 to hold them in the inoperative position, as shown in Fig. 9. A laterally movable support is also provided on the rear of the lens board for holding the latter when it is desired to rest the camera on its side. This device is shown particularly in Fig. 8 and comprises a leg 62, guided in a bearing 63, secured to the board 30 and containing a spring plate 64 having a projection coöperating with notches, or recesses, 65 on the side of the leg.

In one of the chambers of the camera is located a spool or reel which may be rotated by a suitable winding device, indicated by 66, to draw the film from the holding spool located in the other chamber in the well known manner. The centering devices for the end of the winding spool, opposite the winding device, and the corresponding end of the other spool are preferably arranged upon spring arms 68, extending laterally from plate 37, which may be retracted by laterally movable members, in the form of plates 69, resting loosely upon the side 1 of the camera body, beneath the arms 68. These members are provided at their outer ends with inclined surfaces 70 engaging similar surfaces 71 on said arms and at the rear edges of the members are located upwardly extending flanges 72 engaging the edges of the arms 68 to secure the members in operative position.

A camera embodying my invention is adapted to be folded into small compass and when desired for use its lens mounting may be readily adjusted into operative position simultaneously with the action of opening the front or door of the casing.

I claim as my invention:

1. In a camera, the combination with a body having a chamber, a lens mounting adapted to fit therein and means for movably supporting the mounting on the body, of a cover for the chamber and means operated thereby for projecting the lens mounting when the cover is opened.

2. In a camera, the combination with a body having a chamber, a lens mounting adapted to fit therein and means for movably supporting the mounting on the body, of a cover for the chamber and connections between the cover and supporting means operating to move the lens mounting outwardly when the cover is opened.

3. In a camera, the combination with a body having a chamber, a lens mounting fitting therein and arms movably supporting the mounting on the body and permitting it to be moved into and out of the chamber, of a hinged door for closing the chamber and connections between the door and arms operating the latter to project the lens mounting when the door is opened.

4. In a camera, the combination with a body having a chamber, a lens mounting fitting therein and pivoted arms supporting the mounting on the body, of a door hinged to the body at one side of the chamber and adapted to swing outwardly in the direction of movement of the arms, and connections between the door and arms operating the latter to move the lens mounting outwardly above the door when it is opened.

5. In a camera, the combination with a body having a chamber, a lens mounting fitting therein and pivoted arms supporting the mounting on the body, of a door hinged to the body at one side of the chamber and links pivoted to the door and pivotally connected to the lens mounting.

6. In a camera, the combination with a body having side pieces and a central chamber located between them, of a lens mounting fitting within the chamber, bearing plates secured to the mounting and extending forwardly therefrom having ends projecting rearwardly over the side pieces and supporting arms attached to said ends and to the side pieces of the body.

7. In a camera, the combination with a body having side pieces and a central chamber located between them, of a lens mounting fitting within the chamber, bearing plates secured to the mounting and extending forwardly therefrom having ends projecting rearwardly over the side pieces and supporting arms attached to said ends and to the side pieces of the body, a cover for the chamber and links pivoted to the bearing pieces and cover and located within the side pieces of the body.

8. In a camera, the combination with a body having side pieces and a central chamber located between them, of a lens mounting fitting within the chamber, bearing plates extending laterally of the mounting beyond the side pieces, devices connected to latter and the plates for supporting the mounting when projected from the body, a door for the chamber and connections between it and the mounting located within the side pieces to automatically project the mounting when the door is opened.

9. In a camera, the combination with the casing having a chamber, a lens mounting supported upon the casing and adapted to fit within the chamber, of a door hinged to the casing, connections between it and said lens mounting to withdraw the latter when the door is open and a locking device for securing the door projecting in proximity to the edge thereof whereby the door may be released and operated by a single movement.

10. In a camera, the combination with the casing having a chamber therein, and provided with a recess at one side thereof, a lens mount and collapsible connections between it and the casing, of a hinged door connected to the lens mount and having a free edge located adjacent the recess, and a locking device for the door having a portion extending into the recess.

FRANK A. BROWNELL.

Witnesses:
G. WILLARD RICH,
RUSSELL B. GRIFFITH.